May 10, 1949.  T. S. McELRATH  2,469,661
MOUNTING FOR FIELD COIL SUPPORTS
Filed March 21, 1947
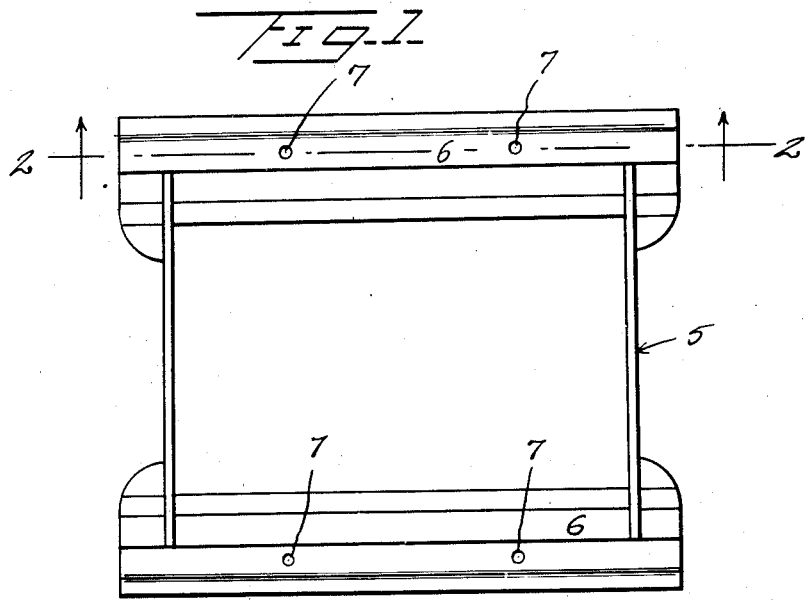
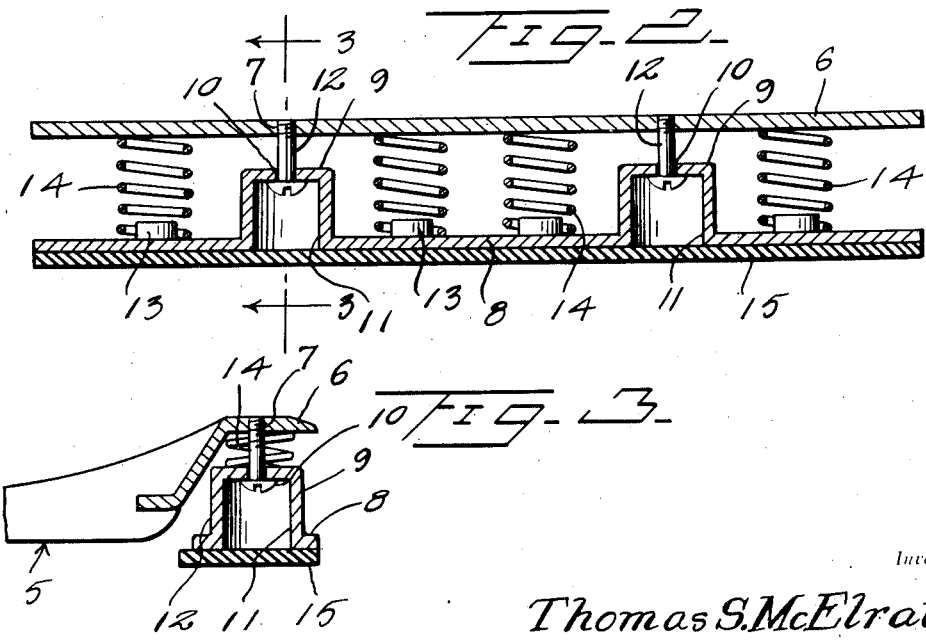
Inventor
Thomas S. McElrath
By Randolph & Beavers
Attorneys Patented May 10, 1949

2,469,661

UNITED STATES PATENT OFFICE 2,469,661

MOUNTING FOR FIELD COIL SUPPORTS

Thomas S. McElrath, Sophia, W. Va.

Application March 21, 1947, Serial No. 736,371

5 Claims. (Cl. 171—252)

This invention relates to an improved spring mounting for field coil supports of electric motors and more particularly has reference to an improved fastening means for movably retaining the ends of a field coil support relatively to the clamp elements thereof.

The conventional manner of providing a connection between the ends of a field coil support and the clamp members, to which said ends are connected, is by means of screws or rivets which extend through the ends of the field coil supports and into the clamps. The shank portions of the screws permits a sliding movement of the coil support ends relatively to the clamps and said ends are cushioned by expansion coil springs interposed therebetween. Due to the vibration to which field coil supports are subjected, these screw fastenings frequently work loose and as they are applied and removed through the ends of the field coil supports, fastenings, when they become disengaged, fall inwardly of the motor toward the armature thereof so as to frequently damage the motor and, if of a magnetic material, the displaced fastenings also produce magnetc problems. Another difficulty arises in respect to the conventional mounting for the fastenings in that in certain electric motors insufficient space is available to accommodate the heads of the fastenings which project toward the armature.

Accordingly, it is a primary object of the present invention to eliminate the objectionable features previously set forth by providing an improved means for mounting the fastenings connecting the ends of a field coil support to its clamps and by means of which, should the fastening become disengaged due to vibration, such fastenings will be prevented from dropping into the motor case and will be retained in engagement with the clamps.

Another object of the invention is to provide an improved mounting wherein the fastenings connecting the field coil to its clamps are so disposed that no space between the field coils and armature is necessary to accommodate the fastenings.

Various other objects and advantages of the invention will hereinafter become more fully apparent from the following description of the drawing, illustrating a preferred embodiment thereof, and wherein:

Figure 1 is a plan view of a field coil support equipped with the improved mounting;

Figure 2 is a cross sectional view thereof, taken substantially along a plane as indicated by the line 2—2 of Figure 1, and Figure 3 is a sectional view taken substantially along a plane as indicated by the line 3—3 of Figure 2.

Referring more specifically to the drawing, the numeral 5 designates generally a conventional type of field coil support for electric motors having transversely disposed end portions 6 which are shown as provided with spaced internally threaded openings 7. The field coil support 5 differs from the conventional field coil support only in that the openings 7 thereof are threaded, for a purpose hereinafter to be described.

Each of the end plates or portions 6 of the support 5 is adapted to be connected to a clamp 8 and as best illustrated in Figures 2 and 3, the clamps 8 are each provided with inwardly offset portions forming sockets 9 provided with openings 10 therein disposed to align with the openings 7. The clamp 8 is provided with openings 11 each of which register with an opening 10 and communicate with the interior of a socket 9 for receiving a screw 12 which extends loosely through the opening 10 and threadedly engages the opening 7 which aligns therewith. It will thus be readily apparent that the headed ends of the screws 12 are contained in the socket 9 and the openings 11 thereof afford access for a tool for engaging the screws for applying them to the field coil support portions 6.

Each clamp 8 is also provided with a plurality of longitudinally spaced tits or projections 13 extending from the inner side thereof and each forming a seat for an end of an expansion coil spring 14, which springs are interposed between the clamps 8 and the end portions 6 for yieldably supporting the field coil 5. A strip of a suitable electrical insulating material 15 is secured to the opposite side of each clamp 8 and said strips may be provided with openings to register with the openings 11 for affording access to the fastenings 12.

It will be readily apparent that the other types of fastenings, such as rivets could be substituted for the screw fastenings 12 provided such fastenings are provided with heads located within the sockets 9.

From the foregoing it will be readily apparent that the shanks of the fastenings 12 by sliding engagement with the openings 10 of the sockets 9 will permit the clamps 8 to move toward and away from the ends 6 of the field coil support 5 within the range as provided by said fastenings in response to shock or vibration. If, as the result of vibration any one or more of the fastenings 12 should work loose from its opening 7, such fastenings will remain lodged in its socket 9, and will thus be prevented from falling toward the center of the electric motor, of which the support 5 forms a part and so as to interfere with the armature or other parts thereof. Likewise, the shank ends of the fastenings 12 will not protrude from the remote sides of the end portions 6 so as to interfere with the armature or other parts, thus enabling such fastenings to be employed where insufficient space is available for accommodating the headed ends of the fastenings on the outer sides of the portions 6. The fastenings 12 are preferably formed of a non-magnetic material.

Various modifications and changes are contemplated and may obviously be resorted to, without departing from the spirit and scope of the invention as defined by the appended claims.

I claim as my invention:

1. Means for resiliently supporting a field coil on a frame comprising a supported projection on the field coil having fastening pins extending therefrom, a frame mounted supporting bar provided with housing portions projecting toward said supported projection and each provided with an opening disposed adjacent the supported projection for slidably receiving one of the fastening pins, said fastening pins having headed portions contained within the housing portions and sized to prevent the passage thereof through the housing openings.

2. A field coil supporting bar as in claim 1, said fastening pins terminating in or flush with the surface of said supporting bar which is disposed remote to said supported projection.

3. A field coil supporting bar as in claim 1, said supporting bar being provided with openings therein communicating with said housing portions.

4. A field coil supporting bar as in claim 1, said supporting bar being provided with openings therein communicating with said housing portions, and a strip of insulating material disposed on the opposite, outer side of the supporting bar.

5. Means for resiliently supporting a field coil on a frame comprising a frame mounted supporting bar, a field coil supported projection having fastening elements extending toward the supporting bar, said supporting bar being provided with housing portions projecting toward said supported projection and each provided with an opening disposed adjacent thereto for slidably receiving one of the fastening elements, said fastening elements having headed portions contained slidably within the housing portions and sized to prevent their passage through the housing openings, expansion coil springs interposed between the supporting bar and said supported projection for yieldably urging said parts away from one another to the limit of movement of said fastening elements in the housing portions, and said supporting bar being provided with projections on its inner side extending into the coil springs and forming retaining means for the latter.

THOMAS S. McELRATH.

REFERENCES CITED

The following references are of record in the file of this patent:

UNITED STATES PATENTS

| Number | Name | Date |
|---|---|---|
| 1,414,773 | Coseo | May 2, 1922 |